(No Model.)
A. H. STEVENS.
BREAD PAN, &c.
No. 479,997.     Patented Aug. 2, 1892.
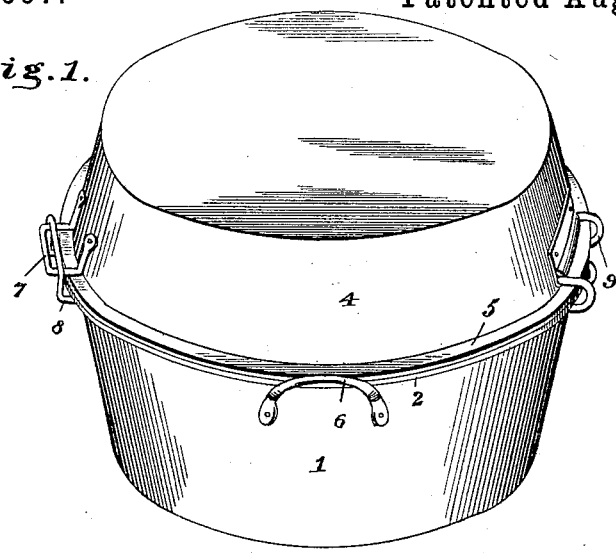
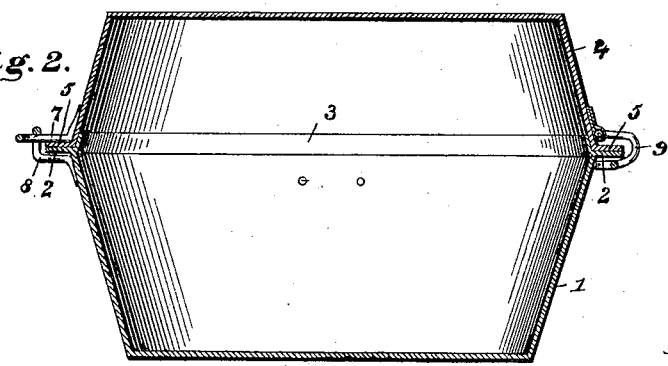
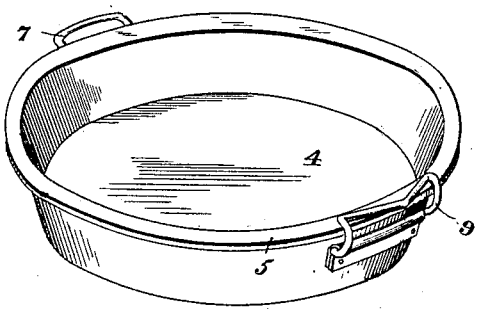
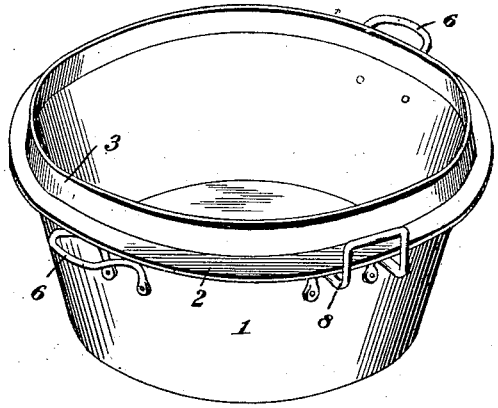
Witnesses
J. Ulke Jr.
N. T. Riley
Inventor
A. H. Stevens.
By his Attorneys,
C. A. Snow & Co.

UNITED STATES PATENT OFFICE.

ANDREW H. STEVENS, OF FARMINGTON, WISCONSIN.

BREAD-PAN, &c.

SPECIFICATION forming part of Letters Patent No. 479,997, dated August 2, 1892.

Application filed June 8, 1891. Serial No. 395,602. (No model.)

*To all whom it may concern:*

Be it known that I, ANDREW H. STEVENS, a citizen of the United States, residing at Farmington, in the county of Polk, State of Wisconsin, have invented a new and useful Pan for Raising Bread, Roasting Meat and Fowls, Baking Beans, &c., of which the following is a specification.

The invention relates to improvements in culinary vessels.

The object of the present invention is to provide a culinary vessel which will be adapted for cooking, for raising bread, and the like and which will prevent the escape of the aroma of the substance being cooked, and which will also prevent the loss of material usually caused by overflowing.

The invention consists in the construction and novel combination and arrangement of parts hereinafter fully described, illustrated in the accompanying drawings, and pointed out in the claim hereto appended.

In the drawings, Figure 1 is a perspective view of a culinary vessel constructed in accordance with this invention. Fig. 2 is a vertical sectional view. Fig. 3 is a perspective view of the upper pan or cover. Fig. 4 is a similar view of the lower pan.

Like numerals of reference indicate corresponding parts in all the figures of the drawings.

1 designates a lower pan or body provided at its upper edge with a horizontal supporting-flange 2 and an approximately vertical flange 3, which flanges form a seat for an upper pan or cover 4, which is provided with a horizontal flange 5, adapted to fit flat upon the horizontal supporting-flange 2. The lower pan or body 1 is provided at diametrically-opposite points with handles 6 and at an intermediate point with a bail 8, which is adapted to receive and be engaged by a bail 7 of the upper pan, whereby the pans are detachably secured together at one side. The upper pan or cover 4 is provided at a point diametrically-opposite the bail 7 with a hinged catch 9, adapted when the cover or upper pan is in place to engage under the supporting-flange of the lower pan or body to secure the upper pan or cover thereto.

The culinary vessel is simple and comparatively inexpensive in construction. It prevents loss or waste from overflowing, it excludes dust and dirt, and maintains a uniform temperature by excluding cold air from its interior, and it also retains the gases and aroma and preserves the flavor of the substances being cooked.

What I claim is—

The herein-described bake-pan, comprising a lower and an upper inverted section, the two being provided at their meeting edges with horizontal annular flanges, and the lower section provided at the inner edge of its horizontal flange with an internal inclined flange fitting within the lower edge of the upper section, the rigid loosely-interlocked and removably-connected bails 7 and 8, secured, respectively, to the sections 4 and 1, and the horizontally-disposed U-shaped locking-bail 9, located diametrically opposite the rigid bails and having its upper terminal or branch pivotally connected to the upper pan-section above its horizontal flange and its lower branch or terminal adapted to be removably sprung under and engaged with the horizontal flange of the lower pan-section, substantially as described.

ANDREW H. STEVENS.

Witnesses:
H. P. BURDICK,
FRANK S. HYAS.